March 28, 1961  L. A. MEDLAR  2,977,525
BATTERY CHARGE MAINTAINING APPARATUS
Filed Sept. 18, 1957  2 Sheets-Sheet 1
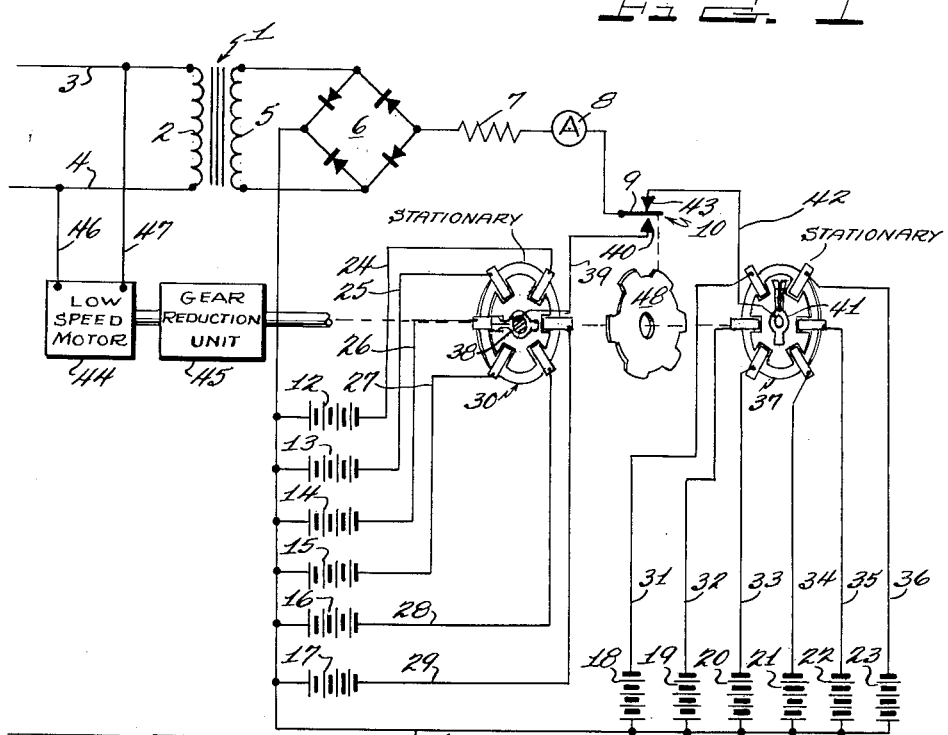
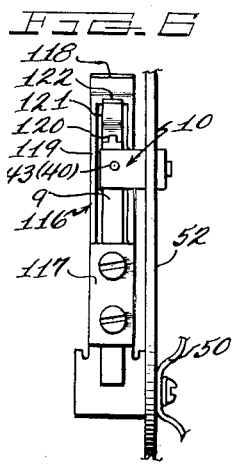
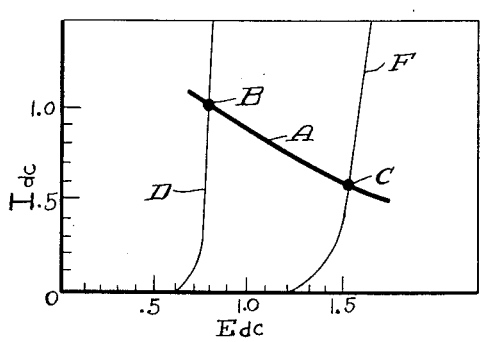
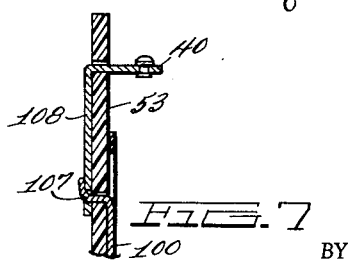
INVENTOR
LEWIS A. MEDLAR
BY
ATTORNEY March 28, 1961  L. A. MEDLAR  2,977,525
BATTERY CHARGE MAINTAINING APPARATUS
Filed Sept. 18, 1957  2 Sheets-Sheet 2
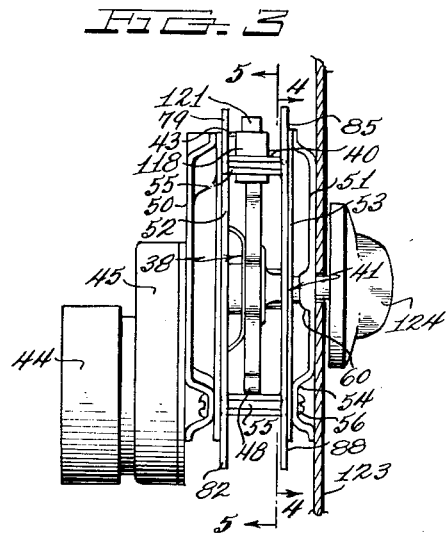
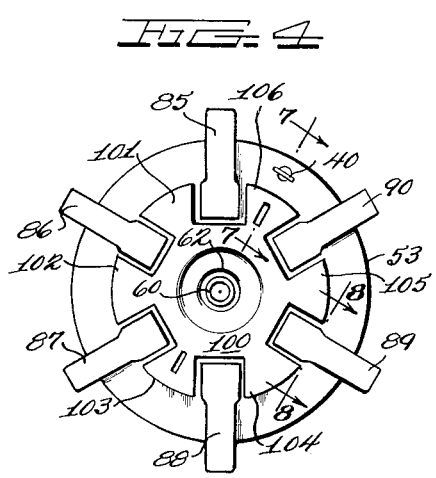
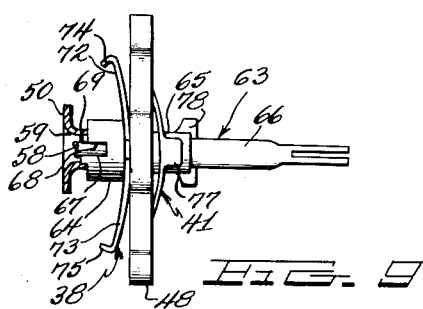
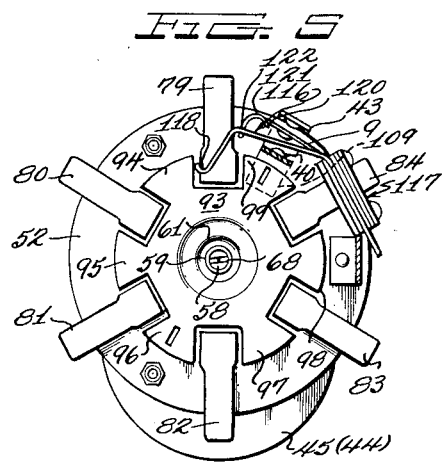
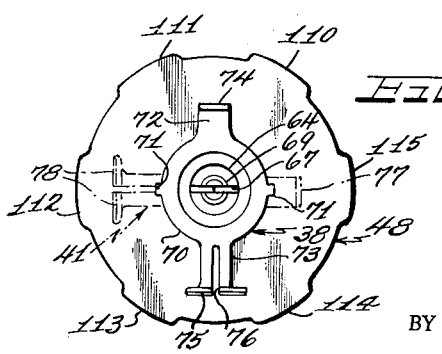
INVENTOR
LEWIS A. MEDLAR
BY
ATTORNEY

United States Patent Office 2,977,525
Patented Mar. 28, 1961

2,977,525

BATTERY CHARGE MAINTAINING APPARATUS

Lewis A. Medlar, Oreland, Pa., assignor to Fox Products Company, Philadelphia, Pa., a corporation of Pennsylvania Filed Sept. 18, 1957, Ser. No. 684,799

3 Claims. (Cl. 320—19)

This invention relates to battery chargers and particularly to improved apparatus for maintaining storage batteries at a substantially constant state of charge. The invention is particularly useful as a charge maintainer for automotive and other lead-acid storage batteries.

In maintaining storage batteries in warehouses, service stations and the like, it has heretofore been the practice to supply to the battery a small charging current continuously, the magnitude of the charging current being selected in accordance with the self-discharge rate of the battery. Such practice is described, for example, in U.S. Patent 2,715,710, issued August 16, 1955, to James B. Godshalk et al. It has now been discovered that charge maintenance of storage batteries by a continuous charging current frequently has severe disadvantages, even though the charge rate be low and carefully controlled, and that such disadvantages can be overcome by making the charging current a periodic direct current. Though the periods of charging in accordance with this latter method are relatively long, the method has become known as "pulse charging."

The disadvantages of battery charge maintenance by use of continuous charging currents are met with primarily at the higher charging rates required when the battery is at higher ambient temperatures. Thus, subjection of a conventional automotive storage battery to a continuous charging current of 150 ma. at 100° F. for a period on the order of 300 days will result in undesirably low final battery capacities on the order of 35–50 amp.-hrs. for a 100 amp.-hr. battery. Use of a continuous charging current of 1.5 amp. at the same ambient temperature and for the same time period will result in final battery capacities as low as 2.5–5.5 amp.-hrs. for a 100 amp.-hr. battery.

On the other hand, it has been found that the same automotive storage battery can be successfully maintained by charging with periodic direct current at, for example, 15 amp. for one hour every 100 hours, 1.5 amps. for 10 hours every 100 hours, 90 amps. for 10 minutes every 100 hours, and so forth. In such cases, maintaining a 100-amp-hr. storage battery over a period of 300 days with ambient temperatures of 100° F., desirably high final battery capacities of 90–100 amp.-hrs. are obtained.

There is thus a definite commercial need for a battery charge maintainer which will automatically supply direct current charging "pulses" on the order of, say, 1.5 amps. for 10 hours every 100 hours. Although the advantages resulting from such pulse charging have not heretofore been recognized, several proposals have been made in the past for pulse charging apparatus. Such proposals have, however, been found to have several disadvantages which make them unsuitable for the presently accepted pulse charging practice.

One such disadvantage arises from the fact that, to be practical, such an apparatus must be capable of charging batteries of different voltage ratings (both 6-volt and 12-volt in the automotive battery field, for example) without requiring expensive components or special attention by a skilled operator. A second, and even more important, difficulty met with is the fact that the time periods involved are relatively long and switching arrangements employed heretofore for establishing the charging "pulses" have been forced to operate so slowly that severe contact burning, and therefore short life, have resulted.

The present invention has as its primary object the provision of an improved battery charge maintainer capable of carrying out the pulse charging method hereinbefore referred to and overcoming the aforementioned disadvantages.

Another object of the invention is to devise a battery charge maintainer capable of pulse charging a plurality of batteries individually and in sequence with automatic adjustment of the charging current level in accordance with the voltage rating of the battery involved. Thus, an apparatus constructed in accordance with the invention may have provision for connection to twelve individual batteries, for example, and the operator can connect either 6-volt or 12-volt batteries to the apparatus at will and without special attention.

A further object of the invention is provision of a battery charge maintainer capable of pulse charging a plurality of individual batteries in sequence, for example, twelve batteries each at the rate of 0.6 amp., for 12-volt batteries, and 1.0 amp., for 6-volt batteries, for periods of 14 hours each in a total 168-hour cycle, such apparatus being characterized by long life and substantial absence of contact burning in the switching means employed.

Yet another object is to provide a novel electrical circuit wherein two groups of parallel load circuit branches as, for example, branches into which batteries are connected for charging, are employed, the circuit being capable of successively energizing the branch circuits of each group, in alternation between groups, with one branch always being energized, and without involving switches which must be replaced frequently because of contact deterioration.

In order that these and other objects of the invention may be understood in detail, reference is had to the accompanying drawings, which form a part of this specification, and wherein:

Fig. 1 is a schematic diagram illustrating one embodiment of the invention;

Fig. 2 is a diagram showing a typical $E_{dc}$—$I_{dc}$ output curve for the apparatus of Fig. 1;

Fig. 3 is a side elevational view of special switching means employed in the embodiment of the invention illustrated in Fig. 1;

Fig. 4 is a sectional view taken on line 3—3, Fig. 3;

Fig. 5 is a sectional view taken on line 4—4, Fig. 3;

Fig. 6 is a plan view of a fast-acting switching means employed in the device illustrated in Fig. 3;

Fig. 7 is a sectional view taken on line 6—6, Fig. 3;

Fig. 8 is a sectional view taken on line 7—7, Fig. 3;

Fig. 9 is a side elevational view of the cam and movable contact assembly employed in the device illustrated in Fig. 3, and Fig. 10 is an end elevational view of said cam and movable contact assembly.

Referring now to the drawings in detail, and first to Fig. 1 thereof, it will be seen that the embodiment of the invention here illustrated comprises a transformer 1, the primary winding 2 of which is connected to an A.C. supply circuit 3, 4. The secondary winding 5 of transformer 1 is connected to the input terminals of a bridge-connected, dry plate rectifier 6.

To one output terminal of the rectifier 6 is connected the series combination of resistance 7, ammeter 8 and movable contact 9 of a fast-acting switch designated generally at 10 and described in detail hereinafter. To the other output terminal of the rectifier is connected a conductor 11 to which is also connected one terminal of each battery 12–17, forming battery group A, and one terminal of each battery 18–23, forming battery group B, the batteries all being connected in proper polarity to be charged by the pulsating D.C. output of the rectifier.

The remaining terminals of batteries 12–17 are connected, via conductors 24–29, respectively, to individual, fixed contact strips secured to an insulating disc forming part of a selector switching means designated generally at 30 and described in detail hereinafter. Similarly, the other terminals of batteries 18–23 are connected, via conductors 31–36, respectively, to individual, fixed contact strips secured to an insulating disc forming part of a second selector switching means designated generally at 37 and described in detail hereinafter. The switching means 30 includes a movable contact 38 arranged to sweep the fixed contact strips to which conductors 24–29 are connected, movable contact 38 being connected, via conductor 39 and as hereinafter explained, to one fixed contact 40 of fast-acting switch 10. The second selector switching means 37 similarly includes a movable contact 41 arranged to sweep the fixed contact strips to which conductors 31–36 are connected, movable contact 41 being connected, via conductor 42 and as hereinafter explained, to the other fixed contact 43 of fast-acting switching means 10.

Movable contacts 38 and 41 are both driven at a predetermined rotational speed by a low speed motor 44 through gear reduction unit 45, the motor 44 being powered from the A.C. supply circuit via conductors 46, 47. As will be later described, movable contacts 38 and 41 are combined as a unitary assembly with a rotary cam 48, which actuates fast-acting switch 10, this assembly being rotated by the output shaft of gear reduction unit 45.

As seen in Fig. 1, movable contacts 38 and 41 are so arranged as to be out of phase with each other at all times to an extent such that, as contact 38 is at the mid-point of its travel across a fixed contact strip of switching means 30, contact 41 is at the mid-point of its travel between two fixed contact strips of switching means 37. Movable contacts 38 and 41 of course are of such width as to be incapable of shorting between adjacent ones of the fixed contact strips. As the tip of contact 38 comes into engagement with one of the fixed contact strips of switching means 30, the tip of contact 41 is still in engagement with one of the fixed contact strips of switching means 37. Thus, switching means 30 "makes" before switching means 37 "breaks." It should now be noted that fast-acting switch 10 selects the switching means 30, 37 alternately, so that only one of the movable contacts 38, 41 is in circuit at any one time. As will be seen from the detailed description of the switching means which follows, the fast-acting switch 10 operates to select one of the switch means 30, 37 only after such switching means has made contact to select a given battery for charging and, conversely, removes that switching means from the circuit prior to the time when it begins to break contact to remove such given battery from the charging circuit. Accordingly, the making and breaking action of the slow switching devices, selector switching means 30, 37, takes place when those devices are out of circuit and therefore electrically inactive. This is an important feature of the invention, since the selector switching means may be operated at very slow rates on the order, for example, of one revolution per week. On the other hand, switch 10, being the only switching device which is always in circuit, moves with a very fast snap action, allowing substantially no time for contact burning.

The individual charging circuits comprising conductors 24–29 and 31–36 are provided with any suitable connector means for attachment to the battery terminals. For example, the connector means may be the conventional annular connector rings with which trickle chargers are normally equipped.

As will now be explained, the operator of the apparatus need give no attention to the question of whether the batteries being connected thereto are 6-volt or 12-volt batteries, for example. The combination of transformer 1, rectifier 6 and resistance 7 constitutes a circuit capable of supplying charging current at different selected current levels automatically in response to connection thereto of batteries of different predetermined voltage ratings.

In battery charging circuits, the charging current supplied by the circuit is in opposition to the battery voltage and the net driving voltage which causes current to flow is therefore the difference between the charging circuit voltage and the battery voltage. Assuming that the charging circuit voltage is substantially constant, which is the usual case, the charging current must inherently vary inversely as the battery voltage changes. The charging circuit can thus be said to have an output curve determined by plotting the output voltage $E_{dc}$, measured at the battery terminals, against the charging current $I_{dc}$. Similarly, considering a storage battery alone, it may be said that the battery has an $E_{dc}$—$I_{dc}$ curve relating current flowing through the battery in a charging direction to the voltage, at the battery terminals, required to produce such current. While the $E_{dc}$—$I_{dc}$ curve for a charging circuit is fixed, the $E_{dc}$—$I_{dc}$ curve for the battery alone is widely variable, depending on the state of charge, temperature, size, history and other battery characteristics.

Obviously, a given charging circuit will charge a given battery at the intersection of the $E_{dc}$—$I_{dc}$ curve for the circuit and the $E_{dc}$—$I_{dc}$ curve for the battery. Since the $E_{dc}$—$I_{dc}$ curve for the battery shifts during charging, the charging rate will also shift.

Conventional charging circuits present an $E_{dc}$—$I_{dc}$ curve having a relatively steep slope of such nature that, if the circuit components are chosen to give a proper charging current level for batteries of one voltage rating, the current level for batteries of a different voltage rating will be so greatly different as to eliminate the possibility of using the circuit on both types of batteries. I have observed that the slope of the $E_{dc}$—$I_{dc}$ curve of the charger is an inverse function of the total charging circuit impedance and, in the rectifier type, of the wave form of the charging current. Thus, the more impedance is added to the circuit, the flatter will be the $E_{dc}$—$I_{dc}$ curve of the charger. In accordance with the invention, I employ in the charging circuit a series-connected supplementary impedance 7 of such value that the $E_{dc}$—$I_{dc}$ curve A, Fig. 2, of the circuit passes through the points B and C representing the intersections of curve A with the $E_{dc}$—$I_{dc}$ curves D and F of the different batteries to be charged. Thus, each of the batteries to be charged is of a different voltage rating calling for a different optimum charging current. In the case illustrated in Fig. 2, curve D is for a 6-volt battery to be charged at 1.0 amp., and curve F is for a 12-volt battery to be charged at 0.6 amp. Since the points B and C, representing the relation between battery voltage rating and optimum charging current, fall on curve A, it can be said that curve A is defined by these points, and it will be obvious that the charging circuit can be employed, without manual adjustment, to charge batteries of either voltage rating at the optimum charging current.

It will be understood that commercial requirements may dictate that the charger be capable of charging batteries of such different voltage ratings that the $E_{dc}$—$I_{dc}$ curve of the charger could not be a simple curve of negative slope. Thus, the battery voltage ratings can be of such varied nature that the required $E_{dc}$—$I_{dc}$ curve of the charger would have a positive slope or even be of relatively complex configuration. In such cases, the desired $E_{dc}$—$I_{dc}$ charger curve is obtained by means other than the simple supplementary impedance here illustrated.

With the charging circuit arranged as in Fig. 1, the resistance 7 may, for example, be approximately 12 ohms, 25 watts capacity, and the circuit may then have a charging rate of about 1.0 amp. when a 6-volt battery is connected thereto and of about 0.6 amp. when a 12-volt battery is connected.

Since the charging levels encountered in most applications of the present invention are low, the power losses arising because of use of resistance 7 are relatively small. This being so, it is particularly advantageous to take advantage of the possibility of using a resistance as the impedance, since the resistance can be replaced easily with one of a different value to accommodate batteries of different voltage ratings than those with which the apparatus was originally intended to be used. When it is necessary to minimize power losses, however, the resistance 7 can be replaced by an inductance. If desired, a capacitive impedance can be employed, in which case the impedance is connected on the A.C. side of the transformer. It will be understood that the impedance can be employed in the circuit on the A.C. side of the transformer even though it be a resistance or inductance. In each case, the effect of the added series impedance is to flatten the $E_{dc}$—$I_{dc}$ curve of the circuit to give the desired different levels of charging current for batteries of each voltage rating to be handled by the apparatus.

Turning now to the details of the switching apparatus employed, reference is had to Figs. 3–10, wherein it will be seen that the fast-acting switch 10 and the selector switching means 30 and 37 are combined in one unit. This unit includes two circular end plates 50, 51, each provided with a central opening. Inwardly of end plate 50 is an insulating disc 52. A similar insulating disc 53 is positioned inwardly of end plate 51. The insulating discs 52 and 53 are spaced somewhat from the respective end plates by reason of offset portions or bosses 54 formed in the end plates. Circumferentially spaced spacer elements 55 are provided to position the discs 52 and 53 in spaced apart relation, the end plates, insulating discs and spacer elements being secured in place by screws 56, Fig. 3, extending through openings in the end plates and insulating discs and threaded into the spacer elements.

Motor 44 and gear reduction unit 45 are mounted as a unit on the outer surface of end plate 50, as by screws 57 threaded into the end plate. As seen in Fig. 5, the output shaft 58 of gear reduction unit 45 extends through central opening 59 of end plate 50, the opening 59 being formed by an inwardly directed tubular boss on the end plate. A similar opening is provided at the center of end plate 51 by an inwardly directed tubular boss at 60, Fig. 3. Insulating discs 52 and 53 are respectively provided with central openings 61, Fig. 5, and 62, Fig. 4.

As best seen in Figs. 9 and 10, the movable contacts 38 and 41 of the selector switching means and the cam for actuating switch 10 are combined into a unitary structure which is rotatably mounted in the switching device and adapted to be driven from output shaft 58 of the gear reduction unit. Such unitary structure comprises a shaft 63 having a large end portion 64, an intermediate portion 65 of smaller diameter and an opposite end portion 66 of still smaller diameter. End portion 64 of larger diameter is provided with a centered transverse slot 67 which embraces the flattened tip 68 of gear reduction unit shaft 58. End portion 64 is also provided with a tubular extension 69 which embraces the cylindrical surface of gear reduction unit shaft 58 and fits snugly within the inwardly directed boss on end plate 50 at 59. Thus, engagement of the flattened end 68 of the gear reduction unit shaft in slot 67 provides a driving engagement between the rotary members of the switching apparatus and the gear reduction unit, while disposition of extension 69 between the gear reduction unit shaft and the boss on end plate 50 provides means for rotatably supporting one end of the rotary assembly comprising contacts 38 and 41 and cam 48.

The cam 48 is provided with a central opening embracing intermediate portion 65 of the shaft, the cam being rigidly secured to the shaft in any suitable manner. Rotary contact members 38 and 41 are of identical configuration and only member 38, as seen in plan in Fig. 10, will be described in detail. The central portion of the contact consists of an annular body 70 of sufficient diameter to surround shaft portion 64 without contacting the same. At diametrically spaced points, body 70 of contact 38 is provided with mounting ears 71 which extend at right angles to the plane of body 70 and are fixed in suitable recesses in cam 48 to secure the contact to the cam. Contact member 38 includes two contact portions 72 and 73 aligned diametrically across body portion 70. Portion 72 is relatively short and terminates in a contact tip 74 which projects outwardly with respect to the body of cam 48. Portion 73 is relatively longer and terminates in a contact tip 75 projecting outwardly from the body of the cam. A longitudinal slot 76 is provided in contact portion 73, dividing the same into two identical units.

Contact member 41, seen in dotted lines in Fig. 10, is identical in all respects to contact member 38 except for being angularly displaced from contact member 38 by 90° and, as seen in Fig. 9, facing in the opposite direction from contact member 38. The contact member 41 thus includes a shorter contact portion terminating in outwardly directed contact tip 77, Fig. 9, and a longer contact portion terminating in outwardly directed contact tip 78, the latter being centrally slotted.

The contact member 38 is formed as an integral unit from sheet spring Phosphor bronze, for example, and is bent so that the contact portions 72 and 73 curve outwardly from the plane of cam 48. The contact member 41 is similarly formed. Fig. 9 shows both contact members in relaxed position.

Insulating disc 52 carries, on the face thereof directed toward cam 48, a circumferentially spaced series of radially directed contact strips 79–84 which, as will be clear from Fig. 1, are connected to conductors 24–29, respectively. As seen in Fig. 4, insulating disc 53 carries, on the face thereof directed toward cam 48, a circumferentially spaced series of radially directed contact strips 85–90 which, as seen in Fig. 1, are connected to conductors 31–36, respectively. At its inner end, each strip 79–90 is provided with a pair of ears which extend through apertures in the corresponding insulating disc and are crimped over to secure the contact strip rigidly in place. Thus, as seen in Fig. 8, contact strip 89 has ears 91, 92 extending through apertures in disc 53 and crimped against the surface of the disc opposite the contact strip.

Also secured to insulating disc 52, on the face thereof directed toward cam 48, is a generally annular conductive plate 93 surrounding opening 61 and having a series of circumferentially spaced, radially outwardly directed ears 94–99 each disposed between adjacent ones of the contact strips 79–84, as seen in Fig. 5. Conductive plate 93 and its ears 94–99 are spaced from contact strips 79–84 and therefore electrically insulated therefrom. Similarly, insulating disc 53 is provided with a generally annular conductive plate 100 surrounding opening 62 and having a series of circumferentially spaced, radially outwardly directed ears 101–106 each disposed between adjacent ones of the contact strips 85–90, as seen in Fig. 4. Conductive plate 100 and its ears 101–106 are spaced from contact strips 85–90 and therefore electrically insulated therefrom.

Conductive plate 100 is secured to insulating disc 53 by tongues stamped from the plate and extending through apertures in the disc. Thus, as seen in Fig. 7, tongue 107 on plate 100 extends through an aperture in insulating disc 53 and is crimped behind, and in electrical contact with, conductive strip 108 lying against the face of disc 53 opposite plate 100. Strip 108 extends outwardly of disc 53 and thence through a second opening in the disc to terminate as fixed contact 40 of switch 10. In the same manner, conductive plate 93, Fig. 5, is provided with a tongue extending through insulating disc 52 and crimped behind a conductive strip 109 extending outwardly on the side of disc 52 opposite plate 93. Conductive strip 109 extends to the periphery of disc 52 and is there bent over to terminate in the other fixed contact 43 of switch 10.

The radial distance from the center of the shaft carrying cam 48 to shorter contact tips 74 and 77 is such that tips 74 and 77 always bear on the bodies of plates 93 and 100, respectively, and never contact strips 79–90. On the other hand, the radial distance from the center of the shaft to the longer contact tips 75 and 78 is such that these contact strips pass over strips 79–84 and ears 94–99, and strips 85–90 and ears 101–106, respectively. Accordingly, rotary contact member 38 acts to connect each strip 79–84 to conductive plate 93 in succession as the assembly illustrated in Fig. 9 is rotated. Similarly, during such rotation, contact member 41 acts to connect each strip 85–90 to conductive plate 100. Since the plates 93 and 100 are electrically connected to fixed contacts 40 and 43 of switch 10, actuation of switch 10, properly timed as later explained, will complete the charging circuit to such battery of group A as has been selected by contact member 38 or to such battery of group B as has been selected by contact member 41.

It will be noted that contact tips 75 and 78 are of sufficient width to bridge between strips 79–90 and ears 94–106 for a material part of a revolution of the rotary contact members. When one of the contact tips 75, 78 is centered on one of the strips 79–90, the circuit is through the contact strip, the complete movable contact member, and the corresponding conductive plate 93, 100. When the contact tip 75 or 78 moves further in rotation, so as to simultaneously contact one of the strips 79–90 and one of the ears 94–106, the circuit is through such strip, the contact tip only, and the corresponding conductive plate. The contact tips 75 and 78 are each split, as by slot 76, Fig. 10, to compensate for any unevenness between the fixed contact strips 79–90 and the ears of conductive plates 93 and 100.

Since contact members 38, 41 are out of phase in rotation, one "makes" while the other "breaks." Thus, when tip 75 of member 38 is directly centered on one of the fixed contact strips 79–84, tip 78 of member 41 is directly centered on one of the ears 101–106, out of contact with any of the contact strips 85–90, and therefore its circuit is incomplete.

Cam 48, provided with six raised portions 110–115, times the action of switch 10 so that movable contact 9 thereof is snapped into engagement with fixed contact 40 only when tip 75 of rotary contact member 38 has been moved well into engagement with one of the contact strips 79–84. At such instant, tip 78 of rotary contact member 41 is still in positive engagement with one of the contact strips 85–90. Similarly, contact 9 snaps into engagement with fixed contact 43 only when tip 78 of member 41 has been moved well into engagement with one of the contact strips 85–90. In this manner, members 38 and 41 are never in circuit when they are either making or breaking contact with one of the fixed contact strips.

As seen in Figs. 5 and 6, switch 10 comprises as actuating member 116 of flat spring metal clamped at one end by suitable insulated mounting means 117 and terminating at the other end in an offset, hooked end 118 engaging the periphery of cam 48. The middle portion 119 of actuating member 116 has its central area removed, so portion 119 consists of two parallel, spaced arms, as seen in Fig. 6. The movable contact 9 of switch 10 comprises a spring finger disposed between the spaced arms of middle portion 119 of the actuating member 116, one end of the spring finger being secured by insulated mounting means 117. The other end of the spring finger of movable contact 9 terminates in a tongue disposed at 120 in a slot in one end of a bow spring 121. The other end of the bow spring is provided with a slot in which is engaged at 122 a tongue on the free end portion of actuating member 116. As seen in Fig. 5, movable contact 9 extends between fixed contacts 40 and 43.

The normal position of spring metal actuating member 116 is such that end 118 thereof is biased against the periphery of cam 48 with such force as to follow the low areas as well as the high areas of the cam. When end 118 engages a low area of the cam, elements 116 and 121 maintain movable contact 9 in engagement with fixed contact 43. As cam 48 rotates, and a high portion thereof raises the end 118 of member 116, contact 9 remains in contact with fixed contact 43 until the plane of member 116 passes contact 9. At that instant, bow spring 121 snaps contact 9 downwardly into engagement with fixed contact 40. This engagement is maintained until further rotation of the cam lowers the end 118 of member 116 to such an extent that the plane of member 116 passes contact 9 in the opposite direction. At this instant, bow spring 121 snaps contact 9 again into engagement with contact 43. Thus, while the effect of cam 48 in moving actuating member 116 may be relatively slow, the resulting actuation of contact 9 is substantially instantaneous.

Cam 48 and discs 52 and 53 are fabricated from a suitable electrical insulating material, such as a laminated phenolic. The conductive elements, including fixed contact strips 79–90, movable contact members 38 and 41 and plates 93 and 100 are preferably of brass.

The specific details of switch 10 are conventional, forming no part of the invention, and are illustrated and described here as one example of a fast-acting switch means useful in accordance with the invention. Reference is made to my copending application, Serial Number 684,742, filed September 18, 1957, in which the switching apparatus of Figs. 3–10 is claimed.

In the apparatus of Fig. 1, it is highly advantageous to be able to select manually the particular battery connected at any one time. Thus, with ammeter 8 indicating operability of the circuit, it is advantageous to be able to manipulate the switching apparatus manually through a complete cycle, connecting batteries 12–23 to the circuit in sequence, and to know which battery is connected at any one time. To accomplish this, portion 66 of the shaft for cam 48 and rotary contacts 38, 41 is extended beyond end plate 51 and beyond the wall 123 of the casing in which the apparatus is housed, as seen in Fig. 3. A manual operating knob 124 is secured to the end of the shaft and is provided with a pointer cooperating with suitable indicia (not shown) on casing 123 to indicate the position of the switching apparatus with reference to connection of the batteries 12–23. Thus, in the embodiment illustrated, the indicia may comprise simply the numbers "1" through "12," each placed at a radial position relative to shaft 66 which will be occupied by the pointer of knob 124 when a specific one of the batteries is connected in circuit by the switching apparatus.

I claim:

1. In an electrical circuit of the type described, the combination of supply circuit means adapted for connection to a source of current; a fast-acting switch comprising a movable contact and a pair of fixed contacts, said movable contact being arranged for snap actuation alternately into engagement with first one and then the other of said fixed contacts, said movable contact being connected to one side of said supply circuit means; rotary selector switching means comprising two groups of fixed contacts and a pair of rotary contacts operatively arranged for sequential engagement each with the contacts of a different one of said groups; two groups of parallel load circuit branches, the branches of one of said groups being each connected between the other side of said supply circuit means and a different one of the fixed contacts of one of said groups of fixed contacts of said selector switching means, the branches of the other of said groups being each connected between said other side of said supply circuit means and a different one of the fixed contacts of the other of said groups of fixed contacts; circuit means connecting each of said rotary contacts to a different one of said fixed contacts of said fast-acting switch and actuating means for actuating said fast-acting switch and the rotary contacts of said selector switch means in timed relation, said rotary contacts being disposed in out of phase relationship with respect to each other so that one rotary contact engages a fixed contact of its corresponding group of contacts of said selector switch means before the other rotary contact disengages a fixed contact of its corresponding group of contacts of said selector switch means, said actuating means being constructed and arranged to actuate the movable contact of said fast-acting switch only at a time when the fixed contact engaged by said movable contact is electrically connected via the corresponding one of said rotary contacts to a fixed contact of said rotary switching means.

2. In a battery charge maintainer, the combination of a D.C. supply circuit; first and second rotary selector switch means each including a group of fixed contacts and a rotary contact adapted to engage said fixed contacts successively; first and second groups of charging circuit branches, each branch including means for connection to at least one battery, the branches of said first group each being connected between one side of said supply circuit and a different one of the fixed contacts of said first selector switch means, the branches of said second group each being connected between said one side of said supply circuit and a different one of the fixed contacts of said second selector switch means; a fast-acting switch having a pair of fixed contacts and contact means for connecting said fixed contacts alternately to the other side of said supply circuit; circuit means connecting one of said fixed contacts of said fast-acting switch to the rotary contact of said first selector switch means; circuit means connecting the other of said fixed contacts of said fast-acting switch to the rotary contact of said second selector switch means, and actuating means operatively associated with said first and second selector switch means and said fast-acting switch to actuate the same in timed relation, said rotary contacts of said selector switch means being arranged in out of phase relation with each other such that when one of said rotary contacts first engages a fixed contact the other of said rotary contacts still engages a fixed contact, said fast-acting switch being arranged to connect the fixed contacts thereof to said supply circuit only at times when such fixed contact is electrically connected, via the corresponding one of said rotary contacts, to one of said charging circuit branches.

3. A battery charge maintainer in accordance with claim 2 and constructed to charge batteries of different voltage ratings, each such battery requiring an optimum charging current related to the voltage rating of the battery, and wherein said supply circuit is characterized by an $E_{dc}$—$I_{dc}$ output curve which intersects the $E_{dc}$—$I_{dc}$ curves for such batteries substantially at the optimum charging current values for the batteries.

References Cited in the file of this patent

UNITED STATES PATENTS

| | | |
|---|---|---|
| 2,496,859 | Dalzell | Feb. 7, 1950 |
| 2,511,821 | Bullard | June 13, 1950 |
| 2,635,221 | Harvey | Apr. 14, 1953 |